United States Patent
Huan et al.

(10) Patent No.: US 7,573,607 B2
(45) Date of Patent: Aug. 11, 2009

(54) METHOD OF SELECTING INKS FOR USE IN IMAGING WITH AN IMAGING APPARATUS

(75) Inventors: Jincheng Huan, Lexington, KY (US); Xuan-Chao Huang, Lexington, KY (US); Brant D. Nystrom, Lexington, KY (US); Richard L. Reel, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 647 days.

(21) Appl. No.: 11/250,002

(22) Filed: Oct. 13, 2005

(65) Prior Publication Data

US 2007/0086026 A1    Apr. 19, 2007

(51) Int. Cl.
*H04N 1/60* (2006.01)
(52) U.S. Cl. .................. 358/1.9; 358/518; 382/162; 345/589
(58) Field of Classification Search .................. 358/1.9, 358/518; 345/189, 589; 382/162
See application file for complete search history.

(56) References Cited

U.S. PATENT DOCUMENTS

| | | | |
|---|---|---|---|
| 5,734,800 A * | 3/1998 | Herbert et al. ............... | 358/1.9 |
| 6,435,657 B1 * | 8/2002 | Couwenhoven et al. ....... | 347/43 |
| 7,123,380 B2 * | 10/2006 | Van de Capelle ............ | 358/1.9 |
| 7,193,747 B2 * | 3/2007 | Saito .......................... | 358/1.9 |
| 2003/0189715 A1 * | 10/2003 | Andresen et al. ............. | 358/1.9 |
| 2005/0128491 A1 * | 6/2005 | Kubo ......................... | 358/1.1 |
| 2006/0055946 A1 * | 3/2006 | Agar et al. ................... | 358/1.9 |

* cited by examiner

*Primary Examiner*—Mark K Zimmerman
*Assistant Examiner*—Miya J Cato
(74) *Attorney, Agent, or Firm*—Taylor & Aust PC

(57) ABSTRACT

A method of selecting inks for use in imaging with an imaging apparatus includes establishing a high fidelity colorant cube having a plurality of vertex lines pertaining to a corresponding plurality of basic inks, and at least one other vertex line pertaining to at least one high fidelity ink; determining first mixing coordinates of the at least one high fidelity ink and the plurality of basic inks for face grids of the high fidelity colorant cube based on a maximum permitted ink amount; determining second mixing coordinates of the at least one high fidelity ink and the plurality of basic inks for interior grids of the high fidelity colorant cube based on the maximum permitted ink amount; and generating a color conversion lookup table based on the first mixing coordinates and the second mixing coordinates for printing with the imaging apparatus.

22 Claims, 10 Drawing Sheets

METHOD OF SELECTING INKS FOR USE IN IMAGING WITH AN IMAGING APPARATUS

BACKGROUND OF THE INVENTION

1. Field of the Invention

The present invention relates to imaging, and, more particularly, to a method of selecting inks for use in imaging with an imaging apparatus.

2. Description of the Related Art

Traditionally, within the printing industry, three or four inks have been used for printing in various printers. A three-ink printer typically employs cyan, magenta and yellow inks (CMY). A four-ink printer typically adds black ink to the basic CMY system to achieve deeper shadow tones. Black is designated "K" and therefore the CMY system becomes a CMYK system with the addition of black ink. Such three and four ink printers produce red (or orange), green, or blue color by overprinting two of the color inks on top of one another. The gamut of overprinting colors available to a given printer is restricted by the properties of the color inks and may not meet the demands of very high quality printing. Recently, printing systems with additional ink such as red (or orange), green, and blue, or any combinations thereof, have been developed for high fidelity (hi-fi) color printing. These inks, such as CMYKRGB or CMYKOG, are often referred as hi-fi color ink sets (wherein the CMYK inks are basic inks, and the RGB inks and OG inks are high fidelity inks), and the printing system that utilizes such inks is known as a hi-fi or high fidelity printer.

In a high fidelity printing system, emphasis has been traditionally directed on enlarging the color gamut of the system by using a greater number of inks, and overprinting more inks for a given color. As printing speed increases, however, problems arise, such as mottling due to shortened drying time. This problem would also occur even on a non-hi-fi printing system, given that the printing speed has been at least doubled compared to two years ago. As technology advances, the printing speed will continue to increase. This requires the hi-fi ink mixing technology to change in order to accommodate higher speed printing, but without generating visual artifacts.

SUMMARY OF THE INVENTION

The invention, in one exemplary embodiment, relates to a method of selecting inks for use in imaging with an imaging apparatus. The method includes establishing a high fidelity colorant cube having a plurality of vertex lines pertaining to a corresponding plurality of basic inks, and at least one other vertex line pertaining to at least one high fidelity ink; determining first mixing coordinates of the at least one high fidelity ink and the plurality of basic inks for face grids of the high fidelity colorant cube based on a maximum permitted ink amount; determining second mixing coordinates of the at least one high fidelity ink and the plurality of basic inks for interior grids of the high fidelity colorant cube based on the maximum permitted ink amount; and generating a color conversion lookup table based on the first mixing coordinates and the second mixing coordinates for printing with the imaging apparatus.

The invention, in another exemplary embodiment, relates to a method of selecting inks for use in imaging with an imaging apparatus. The method includes establishing a basic colorant cube, wherein a first plurality of vertex lines of the basic colorant cube correspond to a plurality of basic inks; projecting at least one high fidelity ink onto a selected at least one other vertex line of the basic colorant cube different from the first plurality of vertex lines to generate a high fidelity colorant cube; determining mixing coordinates of the at least one high fidelity ink and the plurality of basic inks for the high fidelity colorant cube based on a maximum permitted ink amount; and generating a color conversion lookup table based on the mixing coordinates for printing with the imaging apparatus.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
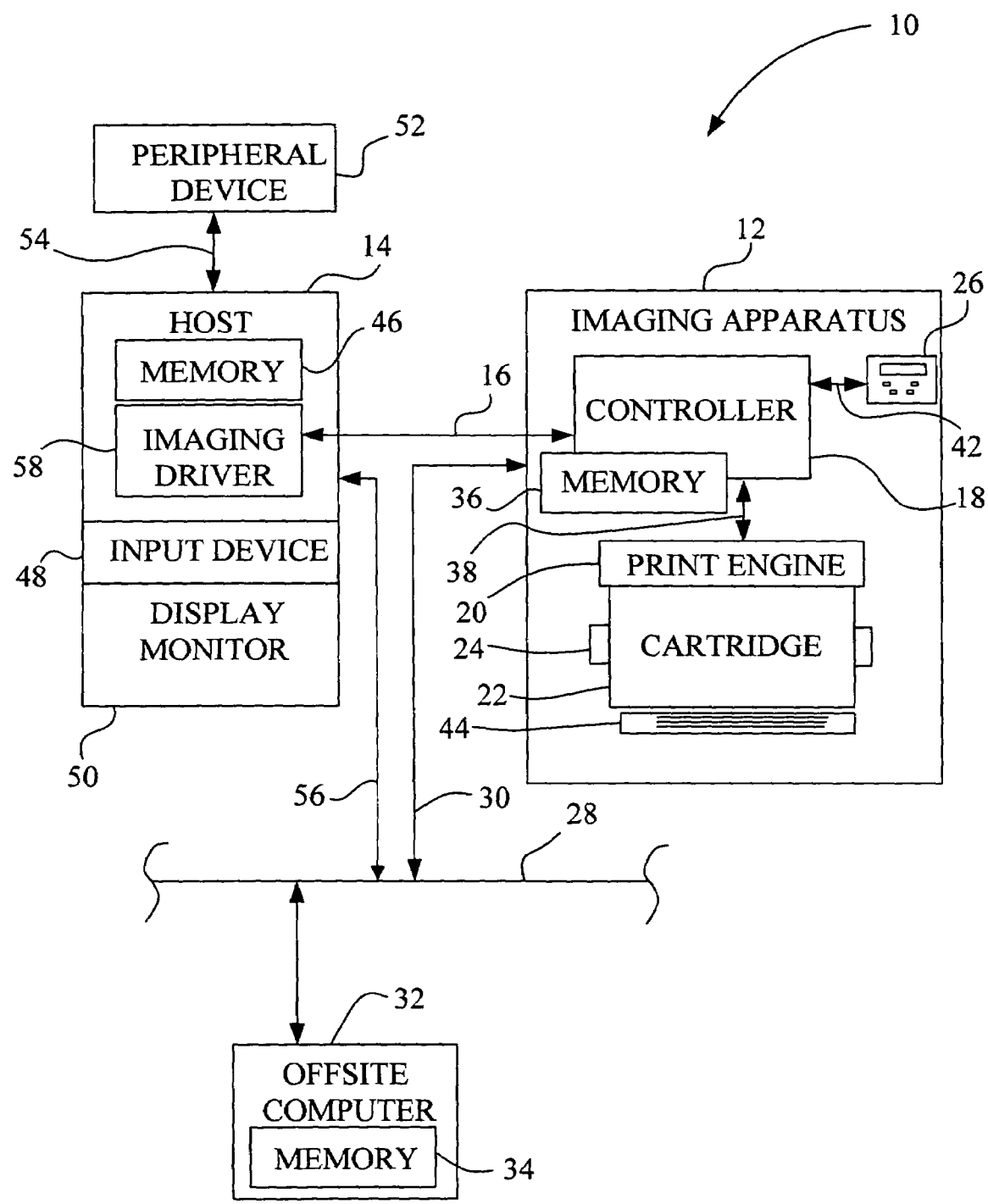
FIG. 1 is a diagrammatic depiction of an imaging system that utilizes the present invention.

Referring now to the drawings, and particularly to FIG. 1, there is shown a diagrammatic depiction of an imaging system 10 embodying the present invention. In the embodiment depicted, imaging system 10 includes an imaging apparatus 12 and a host 14. Imaging apparatus 12 communicates with host 14 via a communications link 16. Alternatively, it is contemplated that imaging system 10 may be an imaging apparatus without a corresponding host computer, such as imaging apparatus 12 in the form of a stand-alone imaging apparatus, wherein the necessary functions of host 14 are performed by imaging apparatus 12 itself.

Imaging apparatus 12 can be, for example, an ink jet printer and/or copier, an electrophotographic printer and/or copier, or an all-in-one (AIO) unit that includes a printer, a scanner, and possibly a fax unit. Imaging apparatus 12 includes a controller 18, a print engine 20, one or more printing cartridges, such as a cartridge 22 having a cartridge memory 24, and a user interface 26. Controller 18 is communicatively coupled to print engine 20. Print engine 20 is configured to mount cartridge 22, as well as to provide a communicative interface between controller 18 and cartridge memory 24. Imaging apparatus 12 has access to a network 28, for example, such as the Internet, via a communication line 30, and is capable of interfacing with other systems, such as an offsite computer 32 having an offsite memory 34, in order to transmit and/or receive data for use in carrying out its imaging functions, updating software or firmware, and/or authenticating cartridge 22. Offsite computer 32 may be a network server operated by, for example, a manufacturer, distributor and/or retailer of cartridge 22, imaging apparatus 12, and/or imaging system 10.

Controller 18 includes a processor unit and an associated memory 36, and may be formed as one or more Application Specific Integrated Circuits (ASIC). Controller 18 may be a printer controller, a scanner controller, or may be a combined printer and scanner controller. Although controller 18 is depicted in imaging apparatus 12, alternatively, it is contemplated that all or a portion of controller 18 may reside in host 14. Controller 18 communicates with print engine 20, cartridge 22, and cartridge memory 24, via a communications link 38, and with user interface 26 via a communications link 42. Controller 18 serves to process print data, to operate print engine 20 during printing, and to perform color correction in accordance with the present invention.

In the context of the examples for imaging apparatus 12 given above, print engine 20 can be, for example, a color ink jet print engine or a color electrophotographic print engine, configured for forming an image on a substrate 44, which may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. As an ink jet print engine, print engine 20 operates cartridge 22 to eject ink droplets onto substrate 44 in order to reproduce text or images, etc. As an electrophotographic print engine, print engine 20 causes cartridge 22 to deposit toner onto substrate 44, which is then fused to substrate 44 by a fuser (not shown).

Host 14 may be, for example, a personal computer, including memory 46, an input device 48, such as a keyboard, and a display monitor 50. A peripheral device 52, such as a digital camera, is coupled to host 14 via a communication link 54. Host 14 further includes a processor, input/output (I/O) interfaces, and is connected to network 28 via a communication line 56, and hence, has access to offsite computer 32, including offsite memory 34. Memory 46 can be any or all of RAM, ROM, NVRAM, or any available type of computer memory, and may include one or more of a mass data storage device, such as a floppy drive, a hard drive, a CD and/or a DVD unit or other optical storage devices.

During operation, host 14 includes in its memory 46 a software program including program instructions that function as an imaging driver 58, e.g., printer/scanner driver software, for imaging apparatus 12. Imaging driver 58 is in communication with controller 18 of imaging apparatus 12 via communications link 16. Imaging driver 58 facilitates communication between imaging apparatus 12 and host 14, and provides formatted print data to imaging apparatus 12, and more particularly, to print engine 20. Although imaging driver 58 is disclosed as residing in memory 46 of host 14, it is contemplated that, alternatively, all or a portion of imaging driver 58 may be located in controller 18 of imaging apparatus 12. Nonetheless, imaging driver 58 is considered to be a part of imaging apparatus 12.

Figure 2:
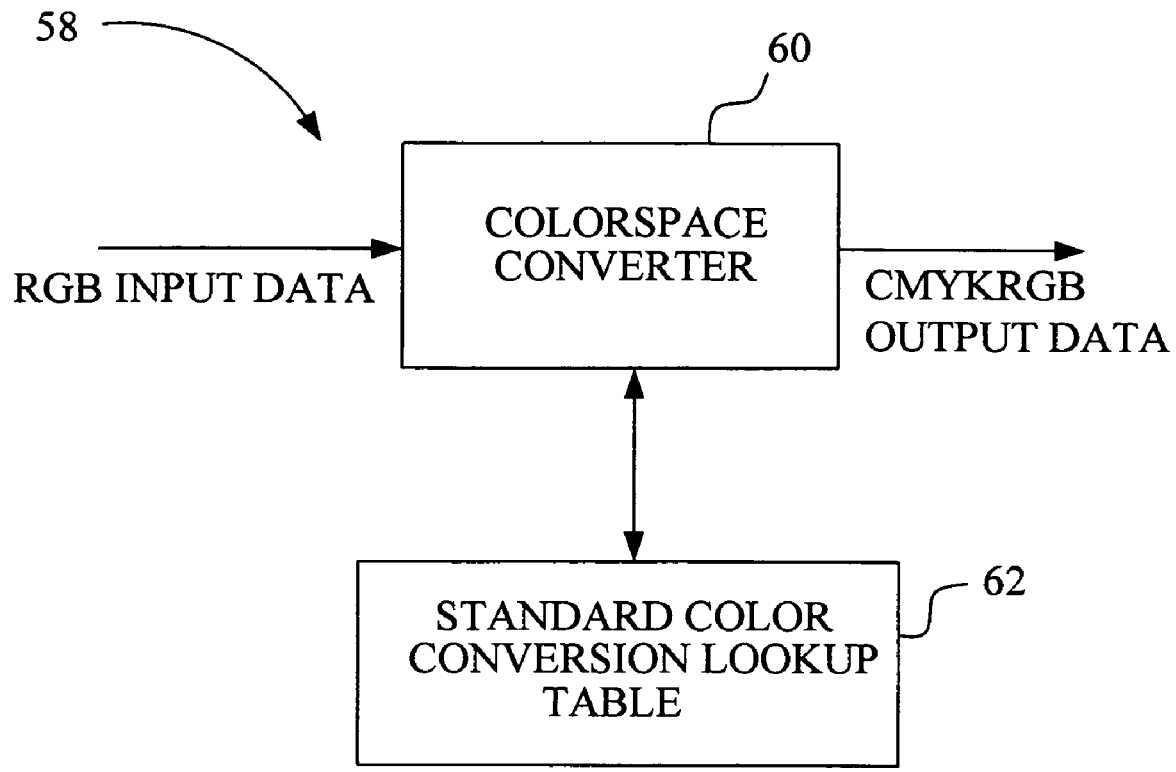
FIG. 2 is a diagrammatic depiction of a colorspace converter accessing a color conversion lookup table in accordance with the present invention.

Referring now to FIG. 2, imaging driver 58 includes a colorspace converter 60. Although described herein as residing in imaging driver 58, colorspace converter 60 may be in the form of firmware or software, and may reside in either imaging driver 58 or controller 18. Alternatively, some portions of colorspace converter 60 may reside in imaging driver 58, while other portions reside in controller 18.

Colorspace converter 60 is used for converting color signals from a first colorspace, such as an RGB colorspace employed by display monitor 50 or a scanner, to a second colorspace, for example, CMYKRGB (cyan, magenta, yellow, black, red, green, and blue), which is used by print engine 20 for printing with cartridge 22. The output of colorspace converter 60 may be used to provide multilevel printing, for example, printing with more than one drop size and/or ink concentration for any or all of the CMYKRGB colors.

The present embodiment is described with respect to CMYKRGB printing, wherein, for example, cartridge 22 takes the form of three separate printhead cartridges; one for printing with CMY inks, one for printing with black (K) ink, and one for printing with the high fidelity RGB inks.

Coupled to colorspace converter 60 is a color conversion lookup table 62. Color conversion lookup table 62 is a multidimensional lookup table having at least three dimensions, and include RGB values and CMYKRGB values, wherein each CMYKRGB output value corresponds to an RGB input value. Color conversion lookup table 62 may also include other data, such as spectral data, or other values or parameters for use in performing color conversion or color correction. As shown in FIG. 2, for example, colorspace converter 60 converts input RBG color data for a displayed or scanned image into color shift corrected CMYKRGB output data that may be printed by print engine 20 using color conversion lookup table 62.

Color conversion lookup table 62 incorporates color conversion data to support color conversion for multiple color formats and the multiple types of substrate 44. Color formats supported by color conversion lookup table 62, include, for example, monochrome K output using true black ink only, CMYRGB color output, wherein neutral colors are formed using process black, also known as composite black, produced by using a combination of CMY and/or RGB color inks, and CMYKRGB color printing using a combination of the CMYRGB color inks and true black ink.

In the embodiment described herein, the colorant increment data is arranged in color conversion lookup table 62 in an ordered format for access by colorspace converter 60 in performing color conversion for printing with imaging apparatus 12.

Color conversion lookup table 62 may alternatively be in the form of groups of polynomial functions capable of providing the same multidimensional output as if in the form of lookup tables.

Figure 3A:
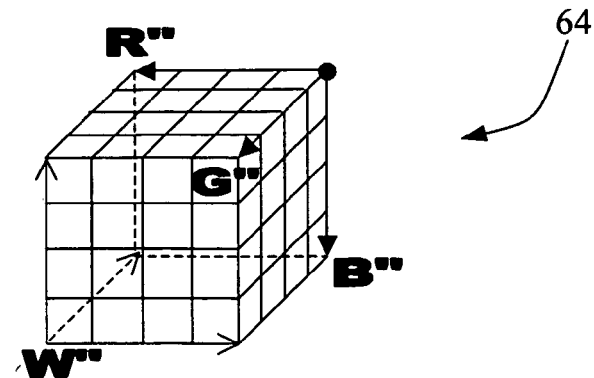
FIGS. 3A and 3B depict input and output colorant spaces for a typical printer.
Figure 3B:
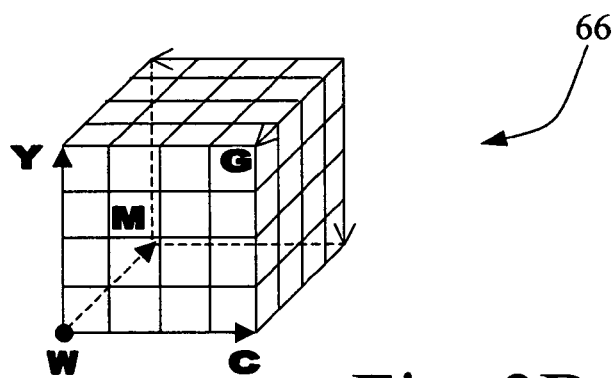

Referring now to FIGS. 3A and 3B, an input colorant space 64 and an output colorant space 66 for a typical printer are depicted. The input colorant space 64 may come from a monitor, scanner, camera, or other imaging devices, and generally consists of red, green, and blue (R"G"B") signals (in order not to be confused with the hi-fi ink symbols, the input signal R, G, or B is superscripted with a symbol "). In 8-bit representation, each of the R"G"B" digital count values range from 0 to 255, forming a cube as shown in FIG. 3A. The output colorant space 66 for a typical CMY printer, depicted in FIG. 3B, is also a cube in which each of CMY digital count values range from 0 to 255 for 8-bit representation, which may be referred to as a basic CMY colorant cube.

It is desirable for printer output that any smooth inputs should be reproduced as smooth outputs. That is, input colors that are changing smoothly from one color to the next should be reproduced as output colors that correspondingly change smoothly from one color to the next. This constraint is generally evaluated in the device-independent CIELAB color space, that is, visually smooth input colors are required to be produced as visually smooth output colors. To this end, it is typically required that smooth input colorant changes correspond to smooth output colorant changes. For example, the input colorant change from white W" to green G" (i.e., W"G" in FIG. 3A) should correspond to a smooth output colorant curve starting from the paper white (W) to a point at or near G in FIG. 3B. For a CMY printer, this smooth curve may be realized by changing cyan (C) and yellow (Y), each of which is smoothly changed from 0 to 255.

Generally, colorants in a CMY cube smoothly change along each of the grid lines throughout the cube (a colorant is either constant or changing linearly from 0 to 255 along any one of the grid lines). It is this feature, "smooth colorant change along any one of the grid lines" that makes it possible to directly sample the cube for CMY printer calibration.

Figure 4:
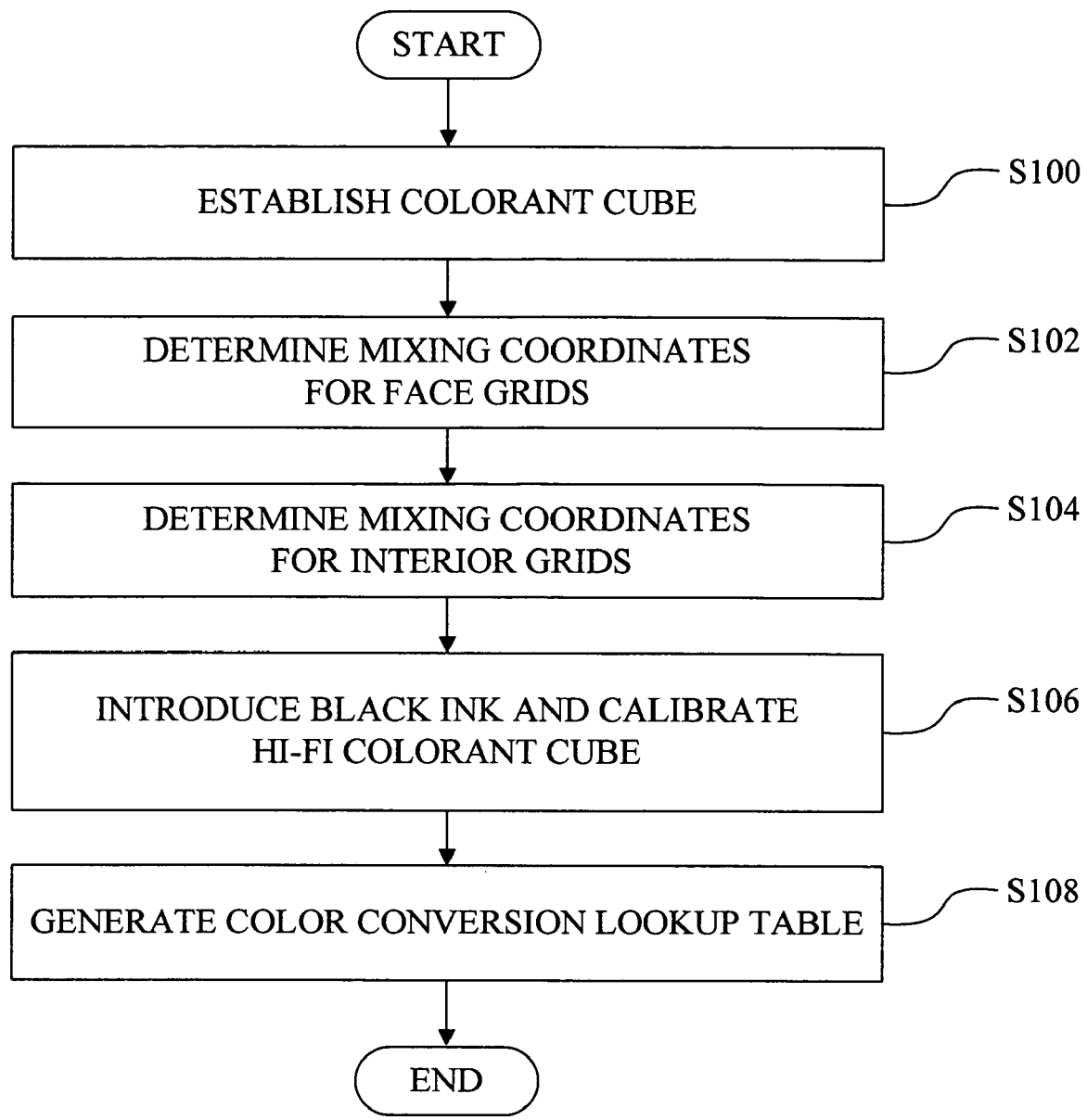
FIG. 4 is a flowchart generally depicting a method of selecting inks for use in imaging with an imaging apparatus in accordance with an embodiment of the present invention.

Referring now to FIG. 4, a method of selecting inks for use in imaging with an imaging apparatus, such as imaging apparatus 12, is depicted with reference to steps S100-S108.

At step S100, generic colorant indices and a high fidelity colorant cube are established. The high fidelity colorant cube has a plurality of vertex lines 70 (depicted in FIG. 6) pertaining to a corresponding plurality of basic inks (CMY), and at least one other vertex line 70 pertaining to at least one high fidelity ink. In the present embodiment, three high fidelity inks, RGB, are employed.

Step S100 is described in greater detail below with respect to FIG. 5 and steps S100-1 to S100-7.

At step S102, mixing coordinates of the at least one high fidelity ink and the plurality of basic inks for face grids of the high fidelity colorant cube are determined based on a maximum permitted ink amount.

Step S102 is described in greater detail below with respect to FIG. 7 and steps S102-1 to S102-9.

At step S104, mixing coordinates of the high fidelity inks and the plurality of basic inks (CMY) for interior grids of the high fidelity colorant cube are determined based on the maximum permitted ink amount.

Step S104 is described in greater detail below with respect to FIG. 9 and steps S104-1 to S104-7.

At step S106, black ink is introduced into the high fidelity colorant cube, and the high fidelity colorant cube is calibrated.

Step S106 is described in greater detail below with respect to FIG. 10 and steps S106-1 to S106-7.

At step S108, color conversion lookup table 62 is generated based on the first mixing coordinates and the second mixing coordinates for printing with imaging apparatus 12.

Step S108 is described in greater detail below with respect to FIG. 11 and steps S108-1 to S108-5.

Figure 5:
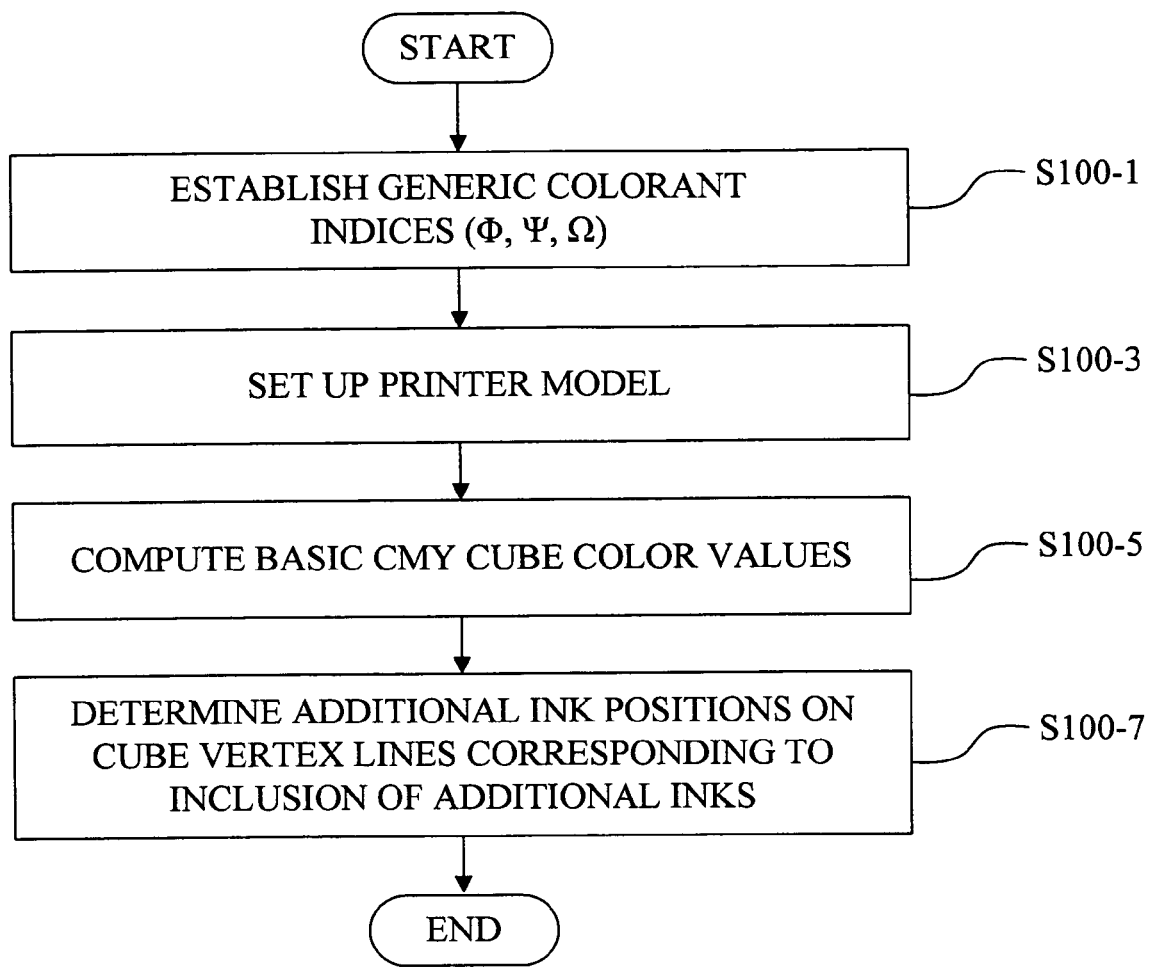
FIG. 5 is a flowchart depicting a process for establishing a high fidelity colorant cube in accordance with the embodiment of FIG. 4.

Referring now to FIG. 5, step S100 is described in greater detail with respect to steps S100-1 to S100-7. The process of steps S100-1 to S100-7 projects the high fidelity inks onto the vertex lines of the basic CMY colorant cube, yielding high fidelity colorant cube 68. In the present embodiment, three high fidelity inks, R, G, and B are projected onto three corresponding vertex lines of the basic CMY colorant cube that are not already associated with one of the C, M, and Y inks.

At step S100-1, generic colorant indices $\Phi$, $\Psi$, and $\Omega$, are established. The generic colorant indices ($\Phi\Psi\Omega$) are representative of a high fidelity set of inks, which include the basic CMY inks and the high fidelity inks (RBG). In establishing high fidelity colorant cube 68, the high fidelity inks are projected onto other vertex lines of the basic CMY colorant cube, i.e., are assigned to other vertex lines of the basic CMY colorant cube that do not correspond directly to one of the CMY colors, so as to yield the high fidelity colorant cube 68.

Generally, any color can be reproduced by three ideal primary inks if they have the spectral properties defined by the CIE Colorimetric System. However, such inks are not practically available due to the limited color properties of actual colorant materials.

Nonetheless, more than three inks, such as a high-fidelity ink set CMYKRGB, may be employed to approximate the properties of the three ideal primary inks. In order to employ the high fidelity ink set, generic colorant indices $\Phi$, $\Psi$, and $\Omega$, each ranging from 0 to 255 in digital count, are employed in accordance with an embodiment of the present invention. In the present embodiment, the generic colorant indices have 8-bit representation, that is, each ranges from 0 to 255 in digital count.

Figure 6:
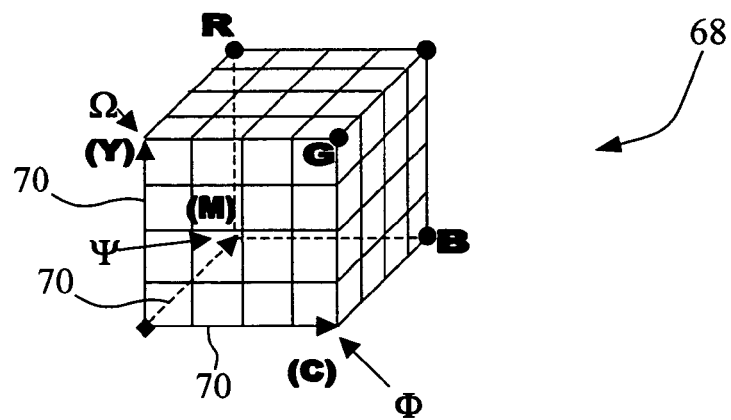
FIG. 6 depicts a high fidelity colorant cube established in accordance with the embodiment of FIG. 5.

Referring now to FIG. 6, a high fidelity colorant cube 68 is depicted, which is formed by colorant indices $\Phi$, $\Psi$, and $\Omega$. Any point within the $\Phi\Psi\Omega$ colorant cube may include more than three ink components, such as C, M, Y, K, R, G, and B (some of which may be zeros). To mix these inks properly, the CMY cube feature "smooth colorant change along any one of the grid lines" is adopted in order to construct a high fidelity colorant cube 68, which may be sampled for calibration. Since printing on some print media types is not performed using pigment based inks, e.g., glossy paper, the method for determining the ink mixing coordinates within the $\Phi\Psi\Omega$ cube is initially performed without black ink, which is then introduced in a separate step. Hence color conversion with or without black ink may be performed.

Referring again to FIG. 5, at step S100-3, a printer model is set up for imaging apparatus 12.

To facilitate the construction of high fidelity colorant cube 68, a printer model associated with imaging apparatus 12 and based on the Neugebauer model is employed. By this model, the CIELAB color value (L*, C*, h*) can be computed for any combination point of C, M, Y, R, G, and B (K=0) based on some measurements.

The first measurement is of the area coverage of inks: Each of the color inks is sampled 9 points evenly spaced over the range from 0% to 100% ink. For CMYRGB inks, a total of 54 (6×9) patches are prepared (printed) for measuring the color values with a spectrophotometer in the present embodiment.

The second measurement pertains to the Neugebauer primary colors: Each Neugebauer primary color is one of all combinations of the inks with each ink having two sampling points: 0% and 100% ink. A total of $2^n$ (64 for n=6) Neugebauer primary color patches are printed and measured in the present embodiment.

Thus, a total of 118 (54+64) color patches will be printed and measured for modeling the CMYRGB ink set in accordance with the present embodiment.

It is noted that some of the Neugebauer primary color patches may result in too much ink being applied to the print medium (the maximum is 600% for CMYRGB ink set, e.g., 100% coverage for each color ink) that may result in mottling or other artifacts. Thus, a maximum permitted ink amount is determined. In the present embodiment, the maximum permitted ink amount is determined based on an amount of ink, above which results in visual artifacts such as mottling. The 100% ink digital counts of such a patch are reduced in accordance with the present embodiment until no artifacts are found. For example, a color patch of (0, 0, 255, 255, 255, 255) with C=M=0 and Y=R=G=B=255 may be reduced to (0, 0, 190, 190, 190, 190). After reduction, all of the Neugebauer primary colors' actual digital counts will be stored in a lookup table for use in the color value computation.

At step S100-5, the color values for the basic CMY colorant cube are computed.

In the ΦΨΩ cube (high fidelity colorant cube 68), C, M, and Y are referred to as basic inks and the other inks (R, G, and B, in the present embodiment) are referred to as additional inks, or as high fidelity inks, herein. The cube formed by CMY without additional inks is called a basic CMY cube with C, M, and Y parallel to Φ, Ψ, and Ω respectively (here the basic CMY cube is the same as ΦΨΩ cube numerically). The basic CMY cube color values for any combinations of (C, M, Y) can be computed by entering the (C, M, Y) digital counts (R=G=B=0) to the printer model.

At step S100-7, the additional ink positions on high fidelity colorant cube are determined. These ink positions are determined with respect to the vertex lines corresponding to the additional inks (the R, G, and B high fidelity inks in the present embodiment).

One of the purposes in using hi-fi inks is to enlarge the color gamut. Since the color gamut boundary is generally corresponding to the colorant cube boundary, the additional inks are projected on the vertex lines of the basic CMY cube. This is performed in the present embodiment by the following three steps:

(1) Each of the 12 vertex lines of the basic CMY cube is divided into 17 even-spaced points over the range from 0% to 100%.

(2) The color values (L*, C*, h*) of these points are computed with the printer model using the point coordinates (C, M, Y).

(3) The color values of the solid patch (100% ink, obtained in the area coverage measurement of step S100-3) of each additional ink are compared with those computed at step (2), immediately above, and the closest point is selected as the additional ink point on the vertex line of the basic CMY cube.

Referring again to FIG. 6, the additional ink points R, G, and B together with the (100%) C, M, and Y points are depicted on the ΦΨΩ cube (high fidelity colorant cube 68). It is seen in FIG. 6 that the additional ink points R, G, and B are indicated on the vertex points of the cube. Note that if another ink color is used, such as orange, it would be located on a vertex line, not on the vertex point.

Figure 7:
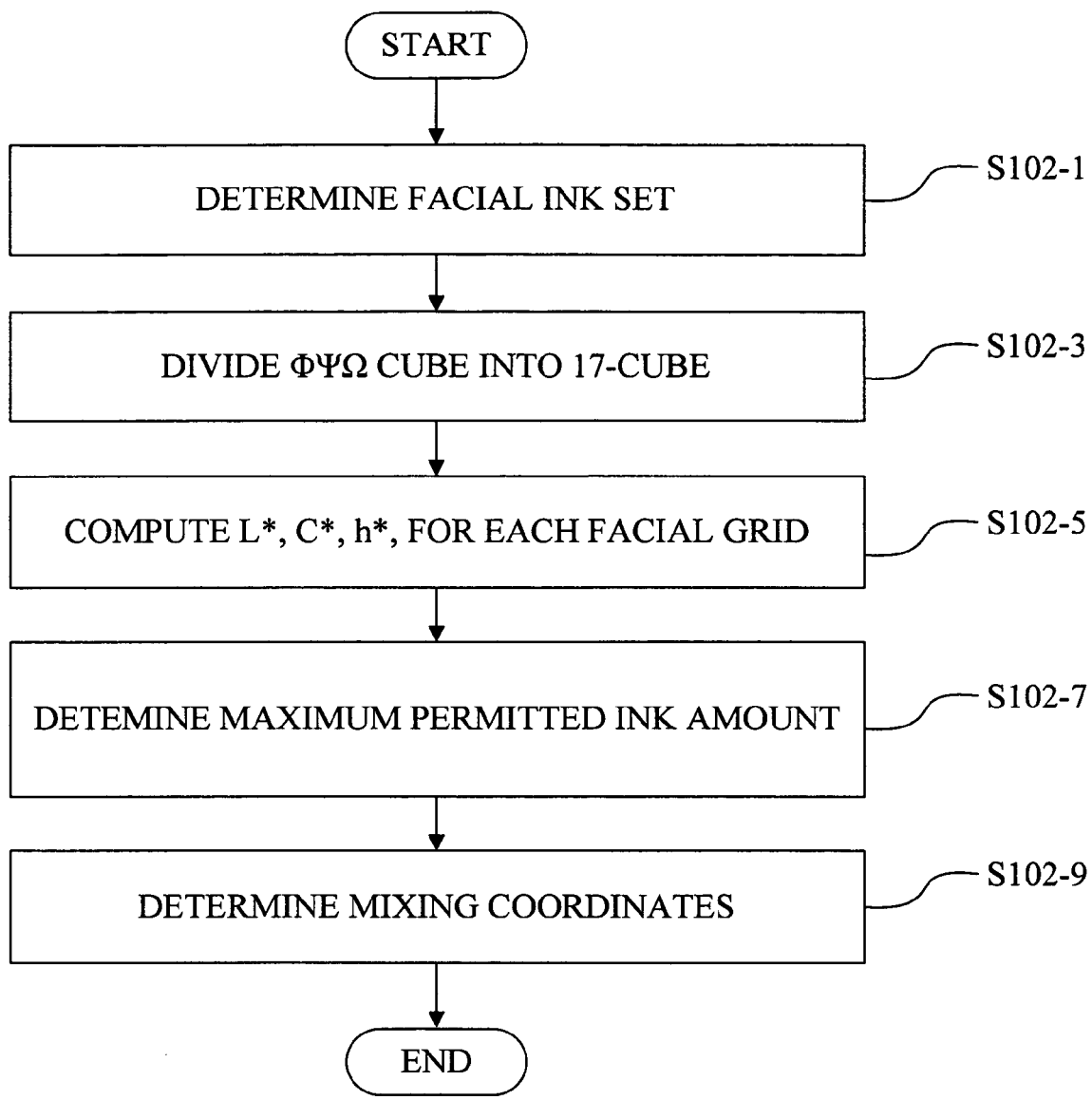
FIG. 7 is a flowchart depicting a process for determining mixing coordinates for face grids of a high fidelity colorant cube in accordance with the embodiment of FIG. 4.

Referring now to FIG. 7, step S102 is described in greater detail with respect to steps S102-1 to S102-9.

As previous indicated, one reason for using high fidelity inks is to enlarge the color gamut of the imaging apparatus. The color gamut boundary generally corresponds to the colorant cube boundary, which is delineated by the faces of high fidelity colorant cube 68. Accordingly, steps S102-1 to S102-9 determine the ink mixing coordinates on the colorant cube boundary (the 6 faces of high fidelity colorant cube 68) with the following criteria: (a) producing a larger gamut than that of the basic CMY inks alone, (b) using minimum sum of ink combination coordinates that meets the constraint of the maximum permitted ink amount, and (3) smoothly changing the digital count distribution of each ink along each grid line using curve fitting.

Figure 8:
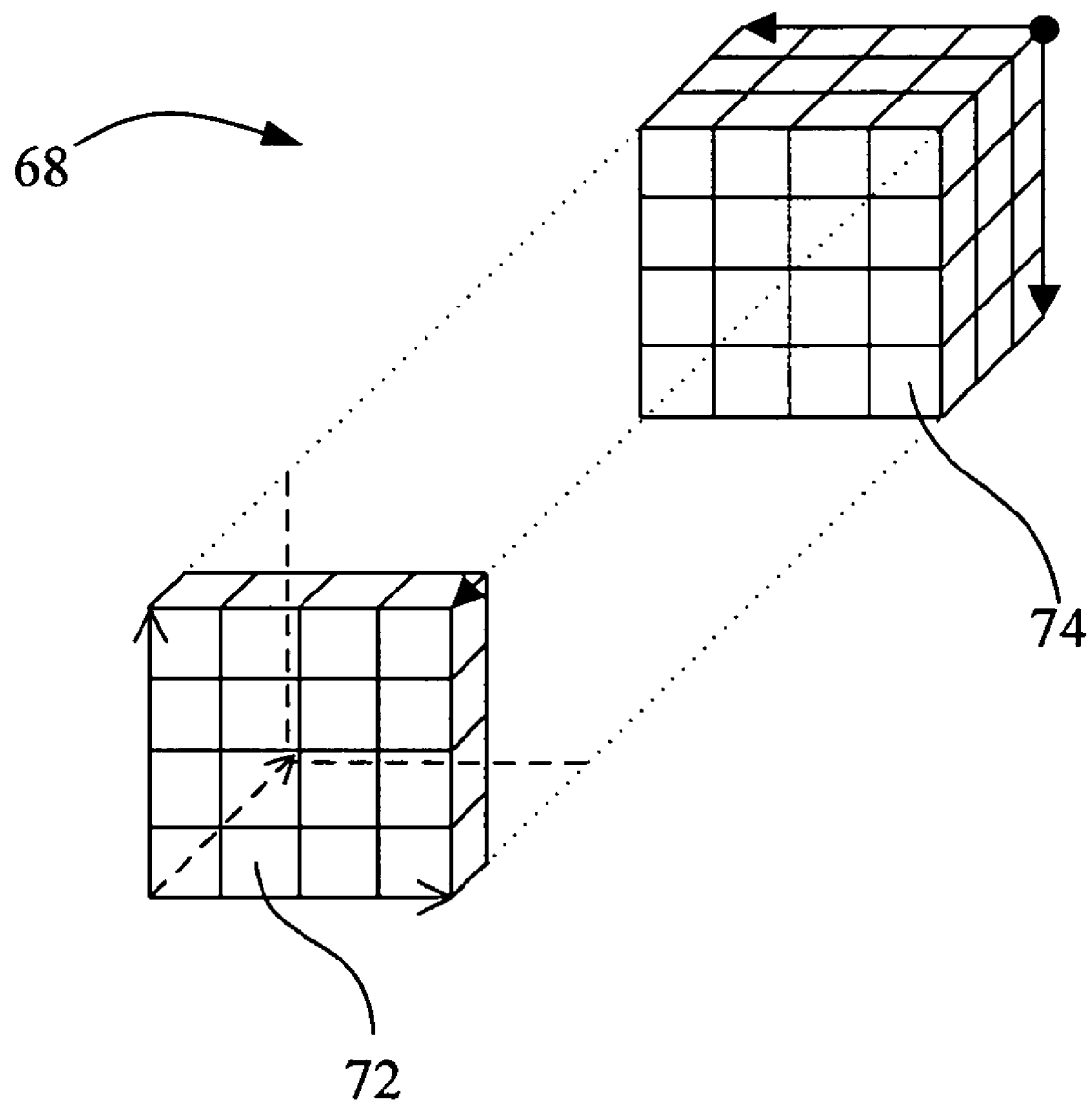
FIG. 8 depicts a face grid and an interior grid of a high fidelity colorant cube established in accordance with the embodiment of FIG. 5.

Referring now to FIG. 8, high fidelity colorant cube 68 is depicted as having been sectioned, so as to illustrate the face grids 72 of the cube as well as the interior grids 74. Face grids 72 are the outer surface grid points of high fidelity colorant cube 68, which being in the shape of a cube, has 6 faces. The interior grids 74 of high fidelity colorant cube 68 are those grid points that are inside high fidelity colorant cube 68 that do not lie on the surface of the colorant cube. Steps S102-1 to S102-9 are performed for each of the six faces of high fidelity colorant cube 68.

Referring again to FIG. 7, at step S102-1, the facial ink set is determined.

On each of the 6 cube faces, there is an ink set lying on the face, referred to herein as the facial ink set. Similar to the basic CMY ink set, each facial ink set may produce a gamut or gamut boundary by printing different percentages of individual inks and their combinations.

Referring again to FIG. 6, the six facial ink sets in the present embodiment are: CYG (front), BMR (back), GYR (top), CMB (bottom), MYR (left), and BCG (right). Each cube face includes the CMY combination from the basic CMY ink alone and also from the facial ink set. If the facial ink set alone can produce a larger gamut, then the facial ink combination will replace that from CMY ink set alone.

Referring again to FIG. 7, at step S102-3, high fidelity colorant cube 68 (ΦΨΩ cube) is divided into a 17-cube as follows.

Each of Φ, Ψ, and Ω is sampled 17 points over the range from 0% to 100% and all of the combinations of the points will form a 17-cube (thus, the basic CMY cube is also a 17-cube). The dimension of 17 is generally selected as the same as the dimension of the color table used for color reproduction in accordance with the present embodiment. If a smaller dimension is selected, there may not be enough data points for curve fitting along a grid line, which might degrade the ink mixing. If a larger dimension is selected, the fitted curvature may be flattened, and thus become useless by the later linear interpolation among the color table grids.

At step S102-5, L*, C*, and h* are computed for each face grid using the basic CMY ink set: The CMY combination coordinates on each face grid are known and just directly used for computation with the printer model.

At step S102-7, the maximum permitted ink amount is determined: The maximum permitted ink amount is the maximum sum of ink digital counts at an ink mixing point above which mottling or other artifacts due to an excessive amount of ink may occur. The maximum permitted ink amount may vary, depending on the substrate and printing speed of a quality mode set in imaging apparatus 12.

At step S102-9, the ink mixing coordinates for each face grid are determined as follows.

(1) Sample each ink of the facial ink set of the cube face in a small increment from 0% to 100% ink. An increment of 4 is suggested, that is, 65 points covering the whole range of individual ink may be used. Then all combinations of the individual ink coordinates, called facial ink set points, are entered into the printer model to compute (L*, C*, h*) color values, with the other ink components that are not in the facial ink set being set to zeros.

(2) Setup a facial grid buffer to hold the grid ink mixing coordinates and the corresponding color values. At each grid, the number of coordinate components equals to the number of all inks employed by the printer. For example, a CMYKRGB printer will have 7 coordinate components. Initialize the facial grid buffer with the basic (C, M, Y) coordinates and color values and the other coordinate components with zeros.

(3) For each face grid, compare its last color value ($L_0^*$, $C_0^*$, $h_0^*$) with the next color value ($L_1^*$, $C_1^*$, $h_1^*$) from one of the facial ink set points until all the facial ink set points are examined, but ignore those points whose sum of coordinates is larger than the maximum permitted ink amount. At each facial ink set point, the coordinate component of the ink that is not in the facial ink set will be set to zero. For example, on the right face with BCG facial ink set, the components of M, Y, and R will be set to zeros (K=0 as mentioned above). In the present embodiment, there are three cases that need to be considered:

Case 1—extending the gamut along the radical direction or reducing ink amount while keeping the same color: if $L_1^*=L_0^*$ and $h_1^*=h_0^*$, then update the facial grid buffer with the new color value and coordinates if $C_1^*>C_0^*$, or if $C_1^*=C_0^*$ and new ink amount is smaller;

Case 2—extending the gamut along the light side: if $C_1^*>=C_0^*$ and $h_1^*=h_0^*$, then update the facial grid buffer with the new color value and coordinates if $L_1^*>L_0^*$ and $L_0^*$ is the greatest (lightest) among all of the colors with the same hue as $h_0^*$ at the facial grid buffer; and Case 3—extending the gamut along the dark side: if $C_1^*>=C_0^*$ and $h_1^*=h_0^*$, then update the facial grid buffer with the new color value and coordinates if $L_1^*<L_0^*$ and $L_0^*$ is the smallest (darkest) among all of the colors with the same hue as $h_0^*$ at the facial grid buffer.

(4) Smooth the digital count distribution of each ink along each face grid line by curve fitting: The ink mixing coordinates found above are not necessarily smooth along the grid lines. To insure that "smooth input colorant changes correspond to smooth output colorant changes", the digital counts of each ink are fitted along a grid line according the following equation:

$$y=a+bx+cx^2 \quad \text{(Equation 1)}$$

where, y is the digital count after fitting, x is the digital count before fitting, a, b, and c are constants to be determined by the curve fitting technique. When c=0, y will linearly change along a grid line; when b and c are zeros, y will be constant along a grid line. Note that there are two grid lines passing though each face grid. In the present embodiment, the average of the two values from the two curves at the grid is employed as the final coordinate digital count of the ink.

For those grids common to different cube faces, an average process will be conducted.

Figure 9:
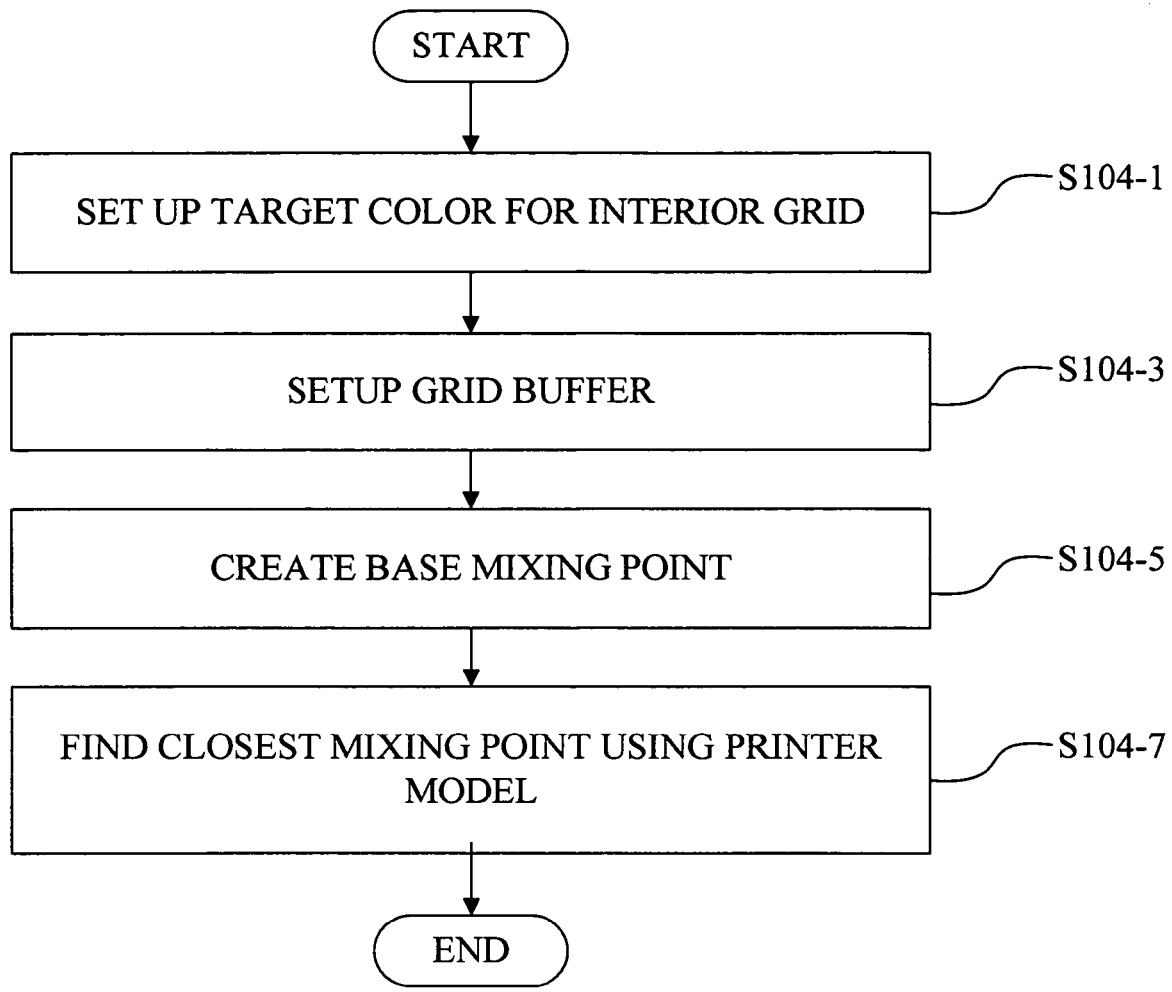
FIG. 9 is a flowchart depicting a process for determining mixing coordinates for interior grids of a high fidelity colorant cube in accordance with the embodiment of FIG. 4.

Referring now to FIG. 9, step S104 is described in greater detail with respect to steps S104-1 to S104-7.

Steps S104-1 to S104-7 describe the procedure for determining ink mixing coordinates on the interior grids of the 17-$\Phi\Psi\Omega$ cube (high fidelity colorant cube 68). The mixing criteria for the interior grids include: (a) producing the target color of an interior grid determined according to the basic CMY coordinates alone and the above-mixed face grids, (b) choosing minimum sum of ink combination coordinates that meets the constraint of the maximum permitted ink amount, and (3) smoothly changing the digital count distribution of each ink along each grid line according to Equation 1.

At step S104-1, the target color for the interior grid is set up (for each point on the interior grid: This target color is the CIELAB ($L^*$, $C^*$, $h^*$) value that should be produced by the ink mixing coordinate components (to be determined) of the interior grid. The determination of this target color is based on the following considerations:

(a) Find the basic color of the interior grid using the basic CMY coordinates alone;

(b) Find the face color difference for each of the two face grids of the interior grid line before and after using the additional inks (the basic CMY ink components at the face grids versus the facial grid coordinate components determined in the above section); and (c) Make the target color that incorporates the face color difference be changed in a similar trend as the basic color. The computation is given as follows:

$$\lambda_L = \frac{(L_{A1}^* - L_{B1}^*)d_2}{(L_w^* - L_{B1}^*)(d_1+d_2)} + \frac{(L_{A2}^* - L_{B2}^*)d_1}{(L_w^* - L_{B2}^*)(d_1+d_2)} \quad \text{(Equation 2)}$$

$$(\lambda_L = 0 \text{ if } L_W^* = L_{B1}^* = L_{B2}^*)$$

$$\lambda_C = \frac{(C_{A1}^* - C_{B1}^*)d_2}{C_{B1}^*(d_1+d_2)} + \frac{(C_{A2}^* - C_{B2}^*)d_1}{C_{B2}^*(d_1+d_2)} \quad \text{(Equation 3)}$$

$$L_A^* = L_B^* + \lambda_L(L_w^* - L_B^*) \quad \text{(Equation 4)}$$

$$C_A^* = (1+\lambda_C)C_B^* \quad \text{(Equation 5)}$$

$$h_A^* = h_B^* \quad \text{(Equation 6)}$$

where, d is the distance between the current interior grid and the face grid in the $\Phi\Psi\Omega$ space, subscript 1 represents one cube face and 2 represents the other face linked with the interior grid line, subscripts B and A represent "before" and "after" using the additional inks, respectively, w represents the paper white, subscript A or B alone (without subscript 1 or 2) represents the current interior grid, $\lambda_L$ is the ratio of lightness $L^*$ difference to the darkness (e.g., $L^*_w - L^*_B$) of the grid and determined by the weighted average of those from the two face grids (Equation 2), and $\lambda_C$ is the ratio of chroma $C^*$ difference to the original chroma of the grid and also determined by the weighted average of those from the two face grids (Equation 3).

From Equations 2-6 it is seen that the target lightness ($L^*_A$) will not be changed if it is a paper white point since $L^*_w - L^*_B = 0$ (Equation 4); also the chroma of a neutral point (chroma=0) remains neutral (Equation 5); and the hue angle of the grid is unchanged (Equation 6). Since there are three grid lines passing through an interior grid, the average of the computed values ($L^*_A$, $C^*_A$, $h^*_A$) from the three grid lines will serve as the target color.

At step S104-3, a grid buffer is set up to hold the interior grid ink mixing coordinates and the corresponding target color value. At each grid, the number of coordinate components equals to the number of all inks employed by the printer. For example, a CMYKRGB printer will have 7 coordinate components. The grid buffer is initialized with the basic (C, M, Y) coordinates, and the additional ink coordinate components set to zero. The grid buffer color value is set as the target color determined in the step S104-1.

At step S104-5, a base mixing point is created.

In the hi-fi ink set like CMYRGB, there exist many mixing points that give the same color. In order to ensure the ink changes smoothly, a base mixing point is created for the grid such that each of the digital counts in the base mixing point linearly changes from one face to the opposite face (e.g., between the left face and the right face of the cube) along a grid line. For an interior grid, there are three grid lines passing through it. The average of the three computed points will be selected as the base mixing point. When several ink mixing points with similar colors are found, the one that is closest to the base mixing point is selected.

At step S104-7, the closest mixing point is found using the printer model.

Starting from the base mixing point, each of the components (6 components for CMYRGB ink set) is sampled in a small increment from 0% to 100% ink. An increment of 4 is suggested, that is, 65 points covering the whole range of individual ink may be used. Then all combinations of the individual ink coordinates are entered to the printer model to compute (L*, C*, h*) color values except those points exceeding the maximum permitted ink amount. This closest mixing point will be selected based on the following:

(a) The error between the color of the selected point and the target color of the grid being processed is less than a predetermined error threshold (delta E=3 is suggested).

(b) Select the point with smaller sum of coordinates if two computed points have an error difference less than 1 delta E.

(c) For those points satisfying (a) and (b), select the one that is closest to the base mixing point.

Steps S104-1 to S104-7 are repeated until all interior grids (grid points) are completed. The ink mixing coordinates found using steps S104-1 to S104-7 are not necessarily smooth along the grid lines. To ensure that "smooth input colorant changes correspond to smooth output colorant changes", the digital counts of each ink are fitted along an interior grid line using Equation 1. Note that for each interior grid, there are three grid lines passing through it. The average of the three values from the three curves at the grid is used in accordance with the present embodiment as the final coordinate digital count of the ink.

The completion of steps S104-1 to S104-7 complete the process of constructing high fidelity colorant cube 68 (ΦΨΩ cube) without black ink.

Figure 10:
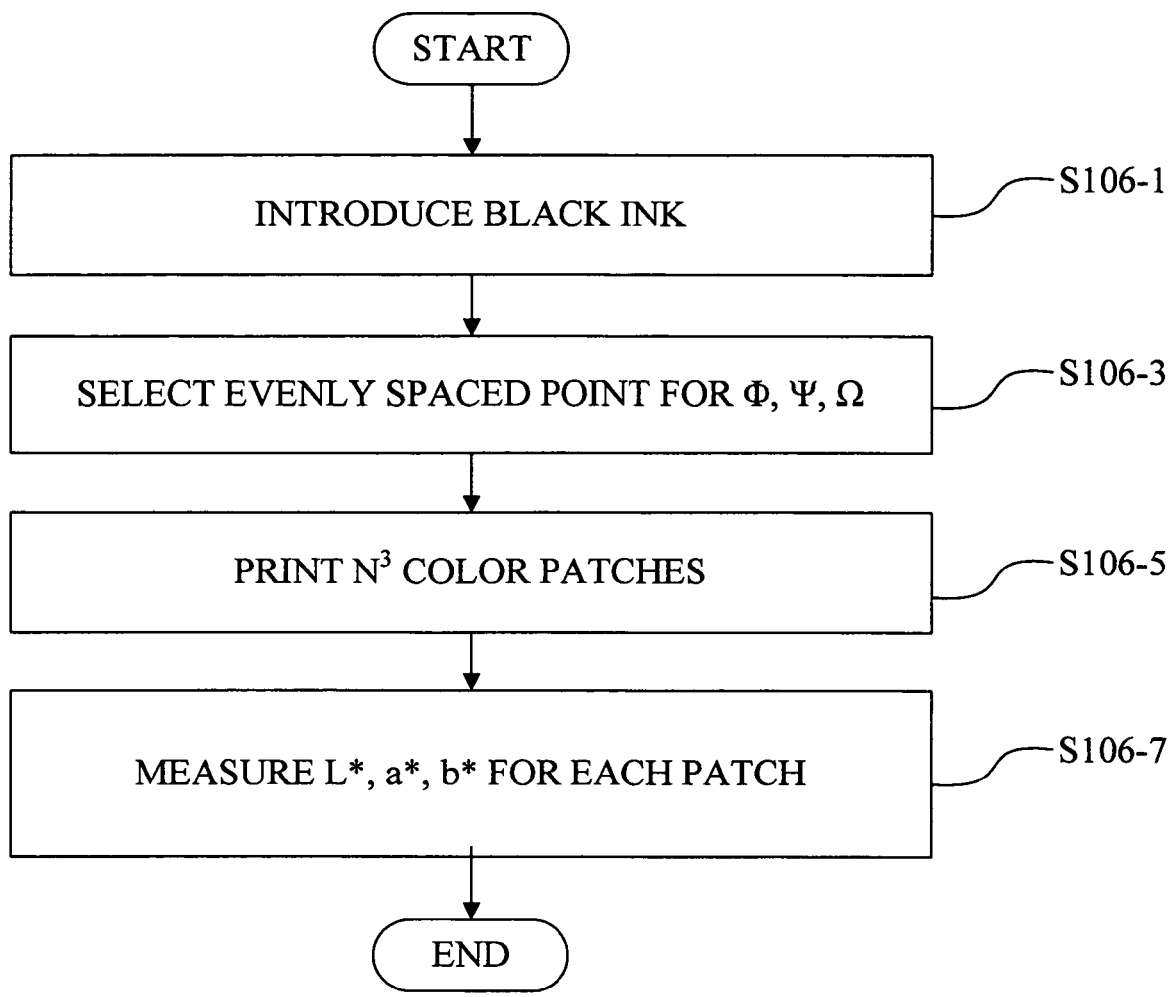
FIG. 10 is a flowchart depicting a process for introducing black ink into a high fidelity colorant cube and calibrating the high fidelity colorant cube in accordance with the embodiment of FIG. 4.

Referring now to FIG. 10, step S106 is described in greater detail with respect to steps S106-1 to S106-7.

At step S106-1, black ink is introduced into high fidelity colorant cube 68.

The high fidelity colorant cube 68 (ΦΨΩ cube) established above contains non-black high fidelity inks. Methods known in the art, such as those described in U.S. Pat. Nos. 6,386,670 B1 and 6,776,473 B2, assigned to Lexmark International, Inc., may be modified in accordance with an embodiment of the present invention to introduce black ink into high fidelity colorant cube 68 by taking the three nominal primary inks Φ, Ψ, and Ω as analogue to the traditional C, M, and Y primary inks. After this process, each grid in the ΦΨΩ cube will contain all of the hi-fi ink components (C, M, Y, K, R, G, B), some of which may be zeros for a given grid (point). Each of the components will smoothly change along the grid line.

The calibration process is described as follows:

Any calibration procedures for CMY 3-color printing may be modified in accordance with an embodiment of the present invention so as to apply to high fidelity colorant cube 68 (ΦΨΩ cube). In the present embodiment, the three variables, generic colorant indices Φ, Ψ, and Ω, are treated as three nominal inks which are analogue to (C, M, Y) variables of the 3-color printing. The difference is that each combination of the C, M, and Y variables contains only three inks (C,M,Y), whereas each combination of the Φ, Ψ, and Ω variables contains 7 inks (C, M, Y, K, R, G, B). The procedure for calibrating high fidelity colorant cube 68 follows.

At step S106-3, evenly spaced points are selected for each of the three variables (Φ, Ψ, Ω). In the present embodiment, N=9 evenly-spaced points are selected, forming a total of $N^3$ ($9^3$=729) combinations. Each combination of the (Φ, Ψ, Ω) variables will contain 7 inks (C, M, Y, K, R, G, B).

At step S106-5, $N^3$ color patches are printed based on the $N^3$ combination points.

At step S106-7, L*, a*, and b* values are measured for each patch. The measurements yield a data set from $N^3$ points (ΦΨΩ) to $N^3$ points (L*, a*, b*). Using three-dimensional interpolation method with respect to (ΦΨΩ), the L*, a*, b* values are computed for each color mixing point of high fidelity colorant cube 68 (ΦΨΩ cube). Since each mixing point (Φ, Ψ, Ω) is associated with the pre-determined 7 inks, the relationship from (C, M, Y, K, R, G, B) to (L*, a*, b*), which is called a printer profile, is readily built.

Figure 11:
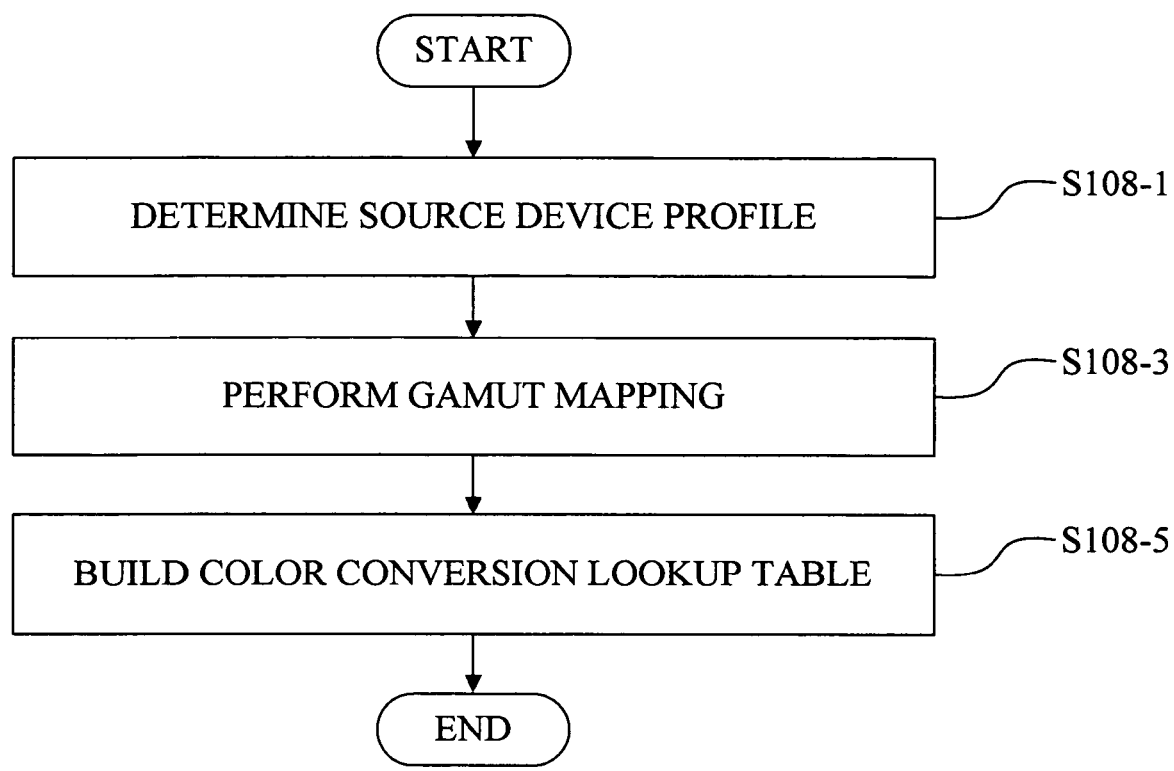
FIG. 11 is a flowchart depicting a process for generating a color conversion lookup table in accordance with the embodiment of FIG. 4.

Referring now to FIG. 11, step S108 is described in greater detail with respect to steps S108-1 to S108-5.

At step S108-1, a source device profile is determined.

If the main application of imaging apparatus 12 is to reproduce the monitor-displayed images, the monitor profile may be selected as the source device profile. In the profile, the relationship from monitor (R",G",B") to (L*,a*,b*) is established.

At step S108-3, gamut mapping is performed. Since the color ranges which can be produced are different between the monitor and printer, mapping the color ranges (gamut mapping) between the two devices is desirable.

At step S108-5, color conversion lookup table 62 is built.

The transformation from one colorant space to another colorant space is usually performed using a color conversion lookup table, such as color conversion lookup table 62. For color reproduction from monitor to printer, the input to the table is (R", G", B") and the output of the table is (C, M, Y, K, R, G, B). In building the color table, Q (Q=17 in the present embodiment) even-spaced points for each of the R", G", and B" are selected, giving a total of $Q^3$ ($17^3$=4913) combinations. The monitor color values (L*, a*, b*) for each combination are then found from the monitor profile. Inverting the printer profile and using the monitor color values as input will give the corresponding printer colorant values (C, M, Y, K, R, G, B). The relationship between the (R", G", B") and (C, M, Y, K, R, G, B) will form color conversion lookup table 62 for color reproduction.

While this invention has been described with respect to exemplary embodiments, it will be recognized that the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of selecting inks for use in imaging with an imaging apparatus, comprising:
   establishing a high fidelity colorant cube having a plurality of vertex lines pertaining to a corresponding plurality of basic inks, and at least one other vertex line pertaining to at least one high fidelity ink, wherein establishing the high fidelity colorant cube includes:
      establishing generic colorant indices (ΦψΩ) representative of a high fidelity set of inks, said high fidelity set of inks including said plurality of basic inks and said at least one high fidelity ink,
      wherein said establishing said high fidelity colorant cube includes projecting said at least one high fidelity ink onto said at least one other vertex line of a basic colorant cube to yield said high fidelity colorant cube;
   determining first mixing coordinates of said at least one high fidelity ink and said plurality of basic inks for face grids of said high fidelity colorant cube based on a maximum permitted ink amount;
   determining second mixing coordinates of said at least one high fidelity ink and said plurality of basic inks for interior grids of said high fidelity colorant cube based on said maximum permitted ink amount; and generating a color conversion lookup table based on said first mixing coordinates and said second mixing coordinates for printing with said imaging apparatus.

2. The method of claim 1, further comprising introducing black ink into said high fidelity colorant cube.

3. The method of claim 2, wherein said imaging apparatus is one of an inkjet printer and an inkjet all-in-one unit, further comprising calibrating said high fidelity colorant cube.

4. The method of claim 1, further comprising:
printing a plurality of color patches; and
determining said maximum permitted ink amount based on said plurality of color patches.

5. The method of claim 4, wherein said plurality of color patches includes a plurality of Neugebauer primary color patches, and wherein said maximum permitted ink amount is determined based on an absence of artifacts in said plurality of Neugebauer primary color patches.

6. The method of claim 5, wherein said maximum permitted ink amount is determined based on reducing a digital count employed in printing said Neugebauer primary color patches until none of said artifacts are found.

7. The method of claim 1, wherein said first mixing coordinates and said second mixing coordinates are determined based on a minimum sum of ink combination coordinates at a color point in said high fidelity colorant cube.

8. The method of claim 1, further comprising:
creating a base mixing point; and
selecting a closest mixing point as being proximate to said base mixing point within a predetermined error threshold to thereby generate each mixing coordinate of said first mixing coordinates and said second mixing coordinates.

9. The method of claim 8, further comprising using a model associated with said imaging apparatus for selecting said closest mixing point.

10. The method of claim 1, further comprising performing curve fitting to smooth a digital count distribution associated with each of said at least one high fidelity ink and said plurality of basic inks.

11. The method of claim 1, wherein said at least one other vertex line pertaining to at least one high fidelity ink is two other vertex lines pertaining to two high fidelity inks.

12. The method of claim 1, wherein said at least one other vertex line pertaining to at least one high fidelity ink is three other vertex lines pertaining to three high fidelity inks.

13. A method of selecting inks for use in imaging with an imaging apparatus, comprising:
establishing a basic colorant cube, wherein a first plurality of vertex lines of said basic colorant cube correspond to a plurality of basic inks;
projecting at least one high fidelity ink onto a selected at least one other vertex line of said basic colorant cube different from said first plurality of vertex lines to generate a high fidelity colorant cube;
determining mixing coordinates of said at least one high fidelity ink and said plurality of basic inks for said high fidelity colorant cube based on a maximum permitted ink amount, wherein determining mixing coordinates includes:
creating a base mixing point corresponding to each of said mixing coordinates: and
selecting a closest mixing point as being proximate to said base mixing point within a predetermined error threshold to thereby generate each mixing coordinate of said mixing coordinates; and
generating a color conversion lookup table based on said mixing coordinates for printing with said imaging apparatus.

14. The method of claim 13, further comprising introducing black ink into said high fidelity colorant cube.

15. The method of claim 14, wherein said imaging apparatus is one of an inkjet printer and an inkjet all-in-one unit, further comprising calibrating said high fidelity colorant cube using a printer model associated with said imaging apparatus.

16. The method of claim 13, further comprising:
printing a plurality of color patches; and
determining said maximum permitted ink amount based on said plurality of color patches.

17. The method of claim 16, wherein said plurality of color patches includes a plurality of Neugebauer primary color patches, and wherein said maximum permitted ink amount is determined based on an absence of artifacts in said plurality of Neugebauer primary color patches.

18. The method of claim 17, wherein said maximum permitted ink amount is determined based on reducing a digital count employed in printing said Neugebauer primary color patches until none of said artifacts are found.

19. The method of claim 13, wherein said mixing coordinates are determined based on a minimum sum of ink combination coordinates at a color point in said high fidelity colorant cube.

20. The method of claim 13, further comprising using a model associated with said imaging apparatus for selecting said closest mixing point.

21. The method of claim 13, wherein said projecting said at least one high fidelity ink onto said selected at least one other vertex line of said basic colorant cube different from said first plurality of vertex lines to generate said high fidelity colorant cube is projecting two high fidelity inks onto two corresponding selected other vertex lines of said basic colorant cube different from said first plurality of vertex lines to generate said high fidelity colorant cube.

22. The method of claim 13, wherein said projecting said at least one high fidelity ink onto said selected at least one other vertex line of said basic colorant cube different from said first plurality of vertex lines to generate said high fidelity colorant cube is projecting three high fidelity inks onto three corresponding selected other vertex lines of said basic colorant cube different from said first plurality of vertex lines to generate said high fidelity colorant cube.

* * * * *